(12) United States Patent
Hall et al.

(10) Patent No.: US 10,991,238 B2
(45) Date of Patent: Apr. 27, 2021

(54) REVERSIBLE ROLLER SHADES WITH LIGHT REFLECTIVE AND HEAT ABSORBING ROLLER FABRIC

(71) Applicants: David R. Hall, Provo, UT (US);
Terrece Pearman, Draper, UT (US);
Emily Brimhall, Apline, UT (US)

(72) Inventors: David R. Hall, Provo, UT (US);
Terrece Pearman, Draper, UT (US);
Emily Brimhall, Apline, UT (US)

( * ) Notice: Subject to any disclaimer, the term of this patent is extended or adjusted under 35 U.S.C. 154(b) by 370 days.

(21) Appl. No.: 15/426,444

(22) Filed: Feb. 7, 2017

(65) Prior Publication Data
US 2018/0223596 A1 Aug. 9, 2018

(51) Int. Cl.
| | |
|---|---|
| *E06B 9/44* | (2006.01) |
| *G08C 17/02* | (2006.01) |
| *E06B 9/72* | (2006.01) |
| *E06B 9/42* | (2006.01) |
| *D06M 11/83* | (2006.01) |
| *E06B 9/68* | (2006.01) |
| *E06B 9/24* | (2006.01) |

(52) U.S. Cl.
CPC ............... *G08C 17/02* (2013.01); *E06B 9/42* (2013.01); *E06B 9/44* (2013.01); *E06B 9/72* (2013.01); *D06M 11/83* (2013.01); *E06B 2009/2441* (2013.01); *E06B 2009/2458* (2013.01); *E06B 2009/6809* (2013.01); *E06B 2009/6818* (2013.01); *E06B 2009/6827* (2013.01); *G05B 2219/2628* (2013.01); *G08C 2201/30* (2013.01); *G08C 2201/93* (2013.01)

(58) Field of Classification Search
CPC ..... E06B 9/68; E06B 9/72; E06B 9/44; E06B 9/40; E06B 9/42; E06B 9/303; E06B 9/307; E06B 9/66; E06B 2009/2458; E06B 2009/2417; E06B 2009/2405
See application file for complete search history.

(56) References Cited

U.S. PATENT DOCUMENTS

| | | | | |
|---|---|---|---|---|
| 4,419,982 | A * | 12/1983 | Eckels | E06B 9/40 126/625 |
| 6,381,888 | B1 * | 5/2002 | Tornqvist | G09F 11/08 40/498 |
| 9,677,331 | B2 * | 6/2017 | Rupel | E06B 9/42 |
| 2009/0005911 | A1 * | 1/2009 | Decroix | E06B 9/72 700/275 |

(Continued)

*Primary Examiner* — Katherine W Mitchell
*Assistant Examiner* — Jeremy C Ramsey (57) ABSTRACT

We disclose a roller shade which may move the roller fabric to position either a light reflecting section or a heat absorbing section of the roller fabric toward a window. The two sections may be on opposite sides of a sheet of roller fabric which is connected to the roller tube at one end. The roller shade may wind the roller fabric around the roller tube then reverse the side of the roller fabric which faces the window. Alternatively, the roller fabric may be a continuous loop of fabric that includes a light reflecting section and connected to a heat absorbing section. The roller shade may move the continuous loop of fabric to position either section toward the window. The roller shade may include sensors, a motor, and a controller. The controller may be programmed to reverse the roller fabric in response to a sensor measurement.

10 Claims, 10 Drawing Sheets

(56) References Cited

U.S. PATENT DOCUMENTS

| | | | |
|---|---|---|---|
| 2011/0155331 A1* | 6/2011 | Lopin | E06B 9/30 160/178.1 R |
| 2012/0043029 A1* | 2/2012 | Gaskill | E06B 9/42 160/121.1 |
| 2013/0057937 A1* | 3/2013 | Berman | E06B 9/68 359/230 |
| 2013/0086832 A1* | 4/2013 | Tornqvist | E06B 9/40 40/470 |
| 2014/0224437 A1* | 8/2014 | Colson | E06B 9/42 160/291 |

* cited by examiner

REVERSIBLE ROLLER SHADES WITH LIGHT REFLECTIVE AND HEAT ABSORBING ROLLER FABRIC

BACKGROUND

Field of the Invention

This disclosure relates to window shades, specifically window shades which regulate the entry of light and heat through the window.

Background of the Invention

Traditional roller shades may be pulled down from a roller tube to various levels to block light from entering the room. They also may include a roller fabric that reflects light or absorbs heat. However, in some situations, it is desirable to reflect incoming solar light while simultaneously absorbing heat from within the adjacent room. At other times, it may be more energy efficient to absorb heat coming in through the window. A roller shade that provides the option of reflecting light or absorbing heat that enters a window is needed. Furthermore, control of precise conditions in which the roller shade either reflects light or absorbs heat is also desirable.

BRIEF SUMMARY OF THE INVENTION

We disclose a roller shade that includes a light reflecting section and a heat absorbing section on the roller fabric. The roller shade is reversible so that one or the other section may be positioned towards the window according to the conditions and a user's choice.

In one embodiment, the roller shade may include a roller tube to which a proximal end of a sheet of roller fabric may be attached. The roller fabric may have light reflecting material on one side of the sheet and heat absorbing material on the other side of the sheet. A weighted member may be connected to the distal end of the roller fabric to provide tension on the roller fabric when the roller fabric is unwound from the roller tube.

When reversing the roller fabric, the roller tube may rotate causing the roller fabric to wind around the roller tube, thus raising the roller shade. When the roller fabric is completely wound around the roller tube, the distal end of the roller fabric may flip over the roller tube to the other side of the roller tube. The roller tube may continue to rotate and unwind the roller fabric with the opposite side of the roller fabric facing the window.

In other embodiments, the roller shade may include a roller tube with a roller fabric that is a continuous loop positioned around the roller tube. The roller fabric may include two sections that are attached to each other end to end. One section may include a light reflecting material on the outer side of the looped roller fabric and another section may include a heat absorbing material on the outer side of the looped roller fabric.

The roller tube may rotate causing the looped roller fabric to rotate. As the roller fabric rotates, the section that was originally facing the window may move around to face the adjacent room. The section of the roller fabric that was original facing the adjacent room may rotate to face the window.

The roller tube may include a motor, a battery, and a gear system. The motor and gear system may rotate the roller tube using power supplied by the battery. The roller tube may also include a controller which may include a memory for storing program code. The controller may be programmed to respond to input and which signals the roller shade to reverse. The roller shade may also include sensors. The controller may be programmed to reverse the roller shade in response to defined sensor readings.

DETAILED DESCRIPTION OF THE INVENTION

While this invention is susceptible of embodiment in many different forms, there are shown in the drawings, which will herein be described in detail, several specific embodiments with the understanding that the present disclosure is to be considered as an exemplification of the principals of the invention and is not intended to limit the invention to the illustrated embodiments.

We disclose a roller shade that includes a light reflecting section and a heat absorbing section and which may be reversible such that either section may face either direction as required. The roller shade consists of a roller tube and a roller fabric. The roller tube may have one or more of an inner volume containing at least one gear, a reversible motor connected to the gear or gears, a battery, a controller, and a communication module.

In one embodiment, the roller fabric may be a single, double-sided sheet. One side of the sheet may include light reflective material and may be constructed of, but is not limited to, the following materials: aluminum, Mylar, chrome, silver, nickel, copper, and reflective paint. The other side of the sheet may include heat absorbing material. A proximal end of the roller fabric may be attached to the roller tube and the distal end may be connected to a weighted member. The motor may rotate the roller tube to raise or lower the roller fabric. In addition, the rotation of the tube may flip the roller fabric around the roller tube, reversing the side of the fabric that faces the window.

In another embodiment, the roller fabric may be a continuous sheet of fabric with only one side of the fabric facing outward. One section of the fabric may include light reflective material and the other half may include heat absorbing material. The roller fabric may loop over or through the roller tube and form a continuous loop that may also pass through an orifice within a weighted member at the bottom of the loop. In this embodiment, the roller tub is at the top of the loop created by the roller fabric. The weighted member may serve as an anchor point to keep the roller shade at least somewhat extended and in slight tension as it rotates around the roller tube. This design allows the roller fabric to rotate such that either the light reflecting or heat absorbing halves of the fabric may face the room.

Some embodiments may include a controller which may include a memory in which to store program code and one or more sensors. The controller may be connected to the one or more sensors, which may include, but are not limited to, a temperature sensor, a visible light sensor, an audio sensor, and an ultraviolet light sensor. For example, a temperature sensor may send a signal to the controller when the sensor detects a defined minimum or maximum temperature, and in response the controller may actuate the motor to raise, lower, or reverse the roller fabric. In another example, a visible light sensor may send a signal to the controller when the sensor detects a defined light measurement within the wavelengths of visible light, and in response the controller may actuate the motor to raise, lower, or reverse the roller fabric. In a third example, an audio sensor may detect a variety of voice commands and send a corresponding signal to the controller in response, which may cause the controller to signal the motor to raise, lower, or reverse the roller fabric. Finally, an ultraviolet sensor may send a signal to the controller when the sensor detects a defined measurement of light within the wavelengths of ultraviolet light, and in response the controller may actuate the motor to raise, lower, or reverse the roller fabric. The motor may be reversible to raise or lower the roller fabric without completely reversing the roller fabric.

In addition, the controller may contain memory for storing program code. The program code may include programming for receiving signals from a mobile device. It may also include a code for signaling the motor to reverse the roller fabric at defined times of day or in response to sensor readings that may be entered through a mobile device.

Figure 1A:
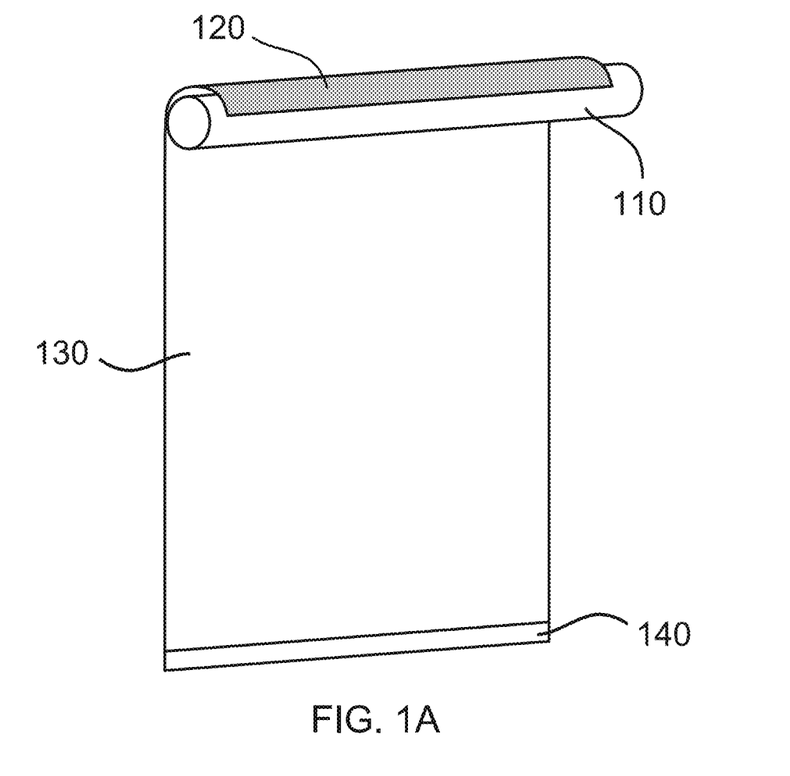
FIG. 1A illustrates an embodiment of the disclosed roller shade with a heat absorbing side facing out.

Referring now to the drawings, FIGS. 1A-D illustrate an embodiment of the disclosed roller shade in the process of reversing the side of the roller fabric that faces the window. The roller shade includes roller tube 110 to which the roller fabric is attached. The roller fabric includes heat absorbing side 120 (shown shaded) and light reflecting side 130 (shown in white). Weight member 140 provides tension to pull the roller fabric down when it is unrolling. FIG. 1A shows the roller shade in a position in which light reflecting side 130 faces the viewer.

Figure 1B:
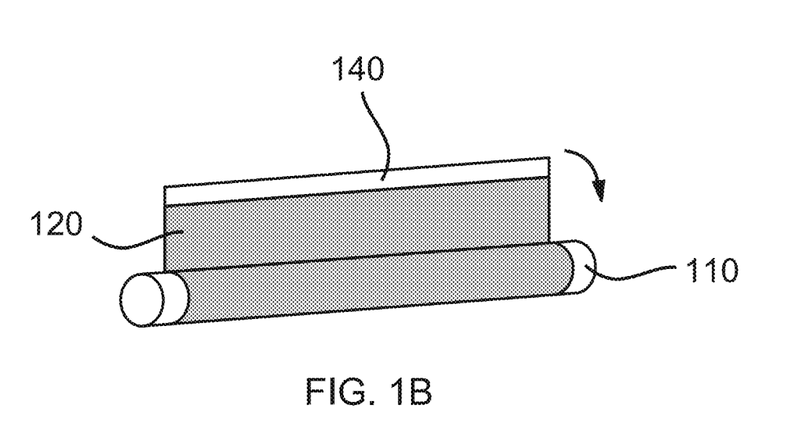
FIG. 1B illustrates the roller shade of FIG. 1A in the process of reversing the sides of the roller fabric.

FIG. 1B illustrates the roller shade of FIG. 1A in the process of reversing the roller fabric. The roller fabric rolls completely around roller tube 110. When the roller fabric is nearly completely rolled around roller tube 110, the distal end of the roller fabric flips up around roller tube 110 with enough force to flip weight member 140 over roller tube 110 to the opposite side (see direction of arrow).

Figure 1C:
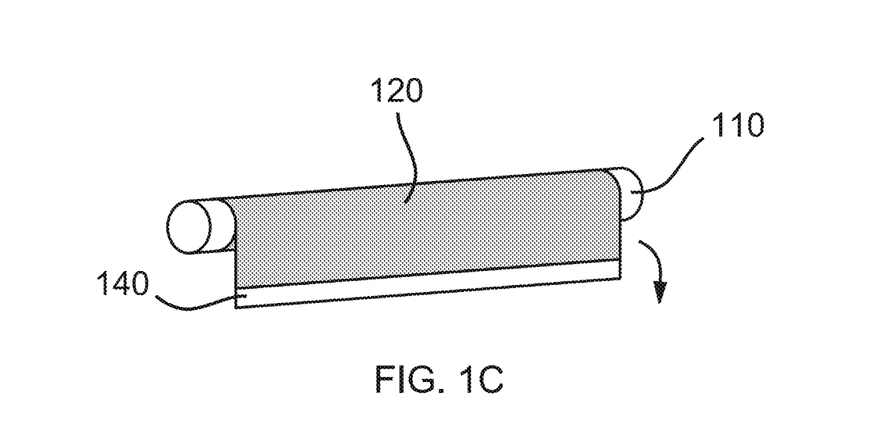
FIG. 1C illustrates the roller shade of FIG. 1B further along in the process of reversing the sides of the roller fabric.

FIG. 1C illustrates the roller shade at the next position of the reversal process. The distal end of the roller shade has continued to travel around roller tube 110 in the direction of the arrow and reached the opposite side of roller tube 110. Weight member 140 then applies tension to assist the roller fabric in descending as roller tube 110 unrolls the roller fabric down the opposite side of roller tube 110.

Figure 1D:
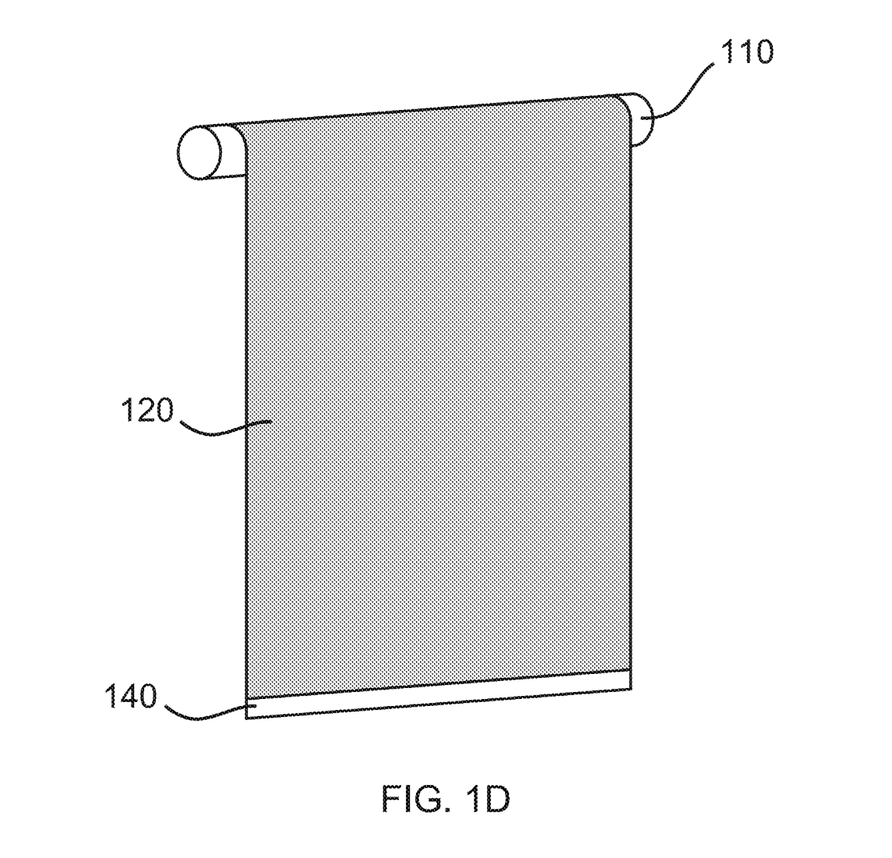
FIG. 1D illustrates the roller shade of FIG. 1A having reversed the roller fabric so that the light reflecting side faces out.

FIG. 1D illustrates the final step in the reversal process in which roller tube 110 unrolls the roller fabric with heat absorbing side 120 now facing the viewer.

Figure 2A:
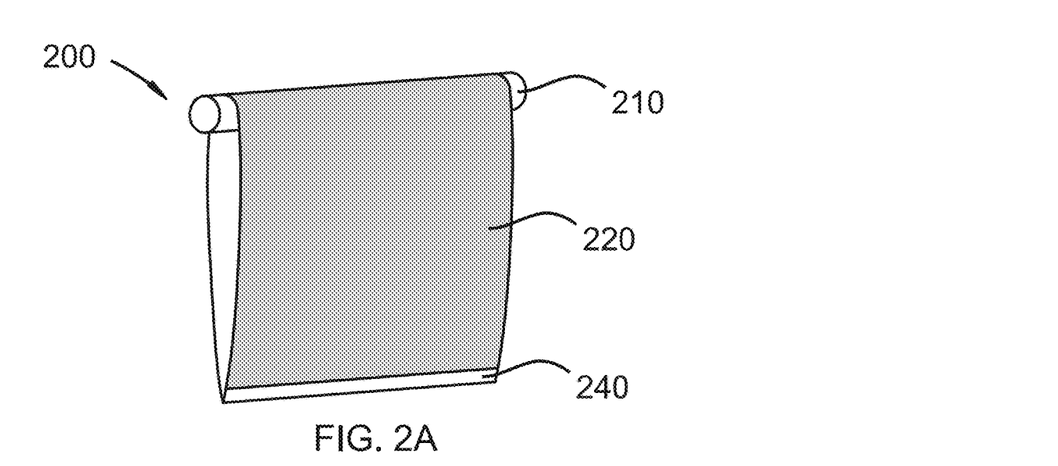
FIG. 2A illustrates another embodiment of the disclosed roller shade
Figure 2B:
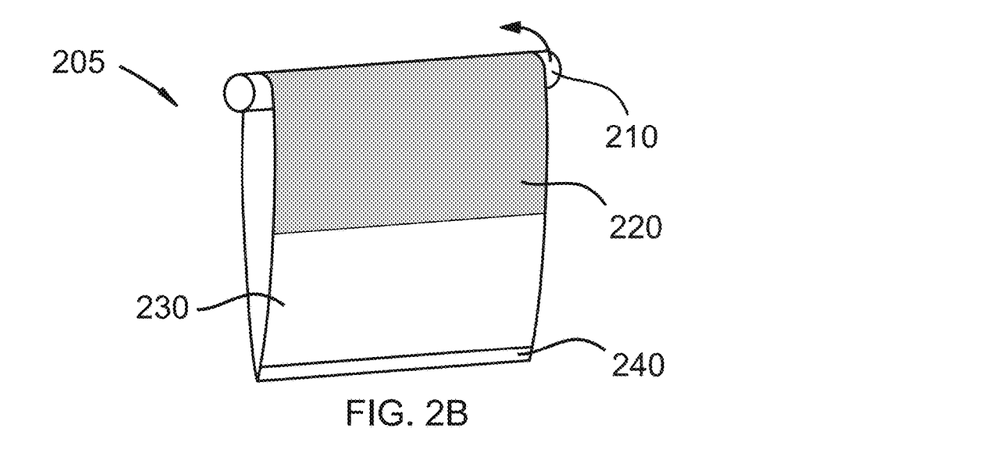
FIG. 2B illustrates the roller shade of FIG. 2A in the process of reversing the sides of the roller fabric.
Figure 2C:
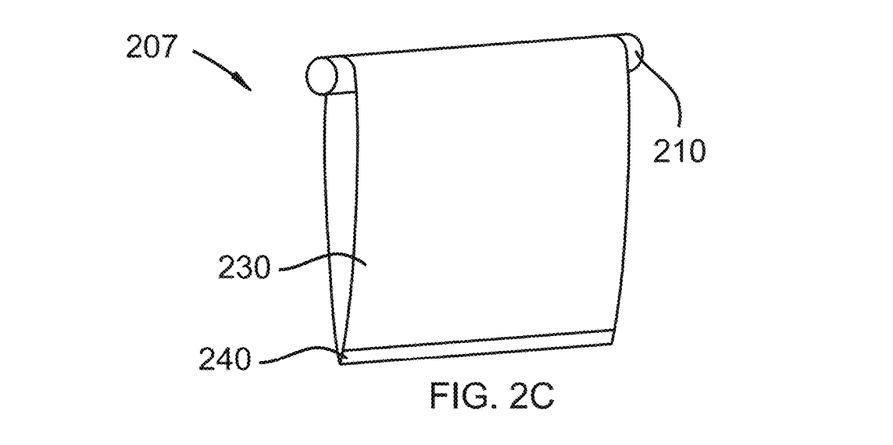
FIG. 2C illustrates the roller shade of FIG. 2A having reversed the roller fabric.

FIGS. 2A-2C illustrate roller shade 200 which another embodiment of the disclosed roller shade in the process of reversing the roller fabric exposed to the window. Roller shade 200 includes roller tube 210. A roller fabric is looped around roller tube 210. Unlike the roller shade of FIGS. 1A-1D, the roller fabric of roller shade 200 is a continuous loop of fabric. The roller fabric includes heat absorbing section 220 (shown shaded) and light reflecting section 230 (shown in white). Weight member 240 provides tension to assist the roller fabric in extending downward. FIG. 2A shows roller shade 200 in a position in which heat absorbing section 220 faces the viewer. Accordingly, light reflecting section 230 faces away from the viewer.

FIG. 2B shows roller shade 205 which is roller shade 200 in the process of reversing the roller fabric. Roller tube 210 is rotating in the direction shown by the arrow which causes the roller fabric to rotate. The intersection of heat absorbing section 220 and light reflecting section 230 is shown as the intersection of white and shaded sections. The roller fabric also loops through an orifice in weight member 240. An embodiment of a weight member which includes an orifice is shown more detail in FIG. 3A. Consequently, the roller shade loops between roller tube 210 and weight member 240 as the roller shade rotates and changes the section facing the viewer.

Figure 3A:
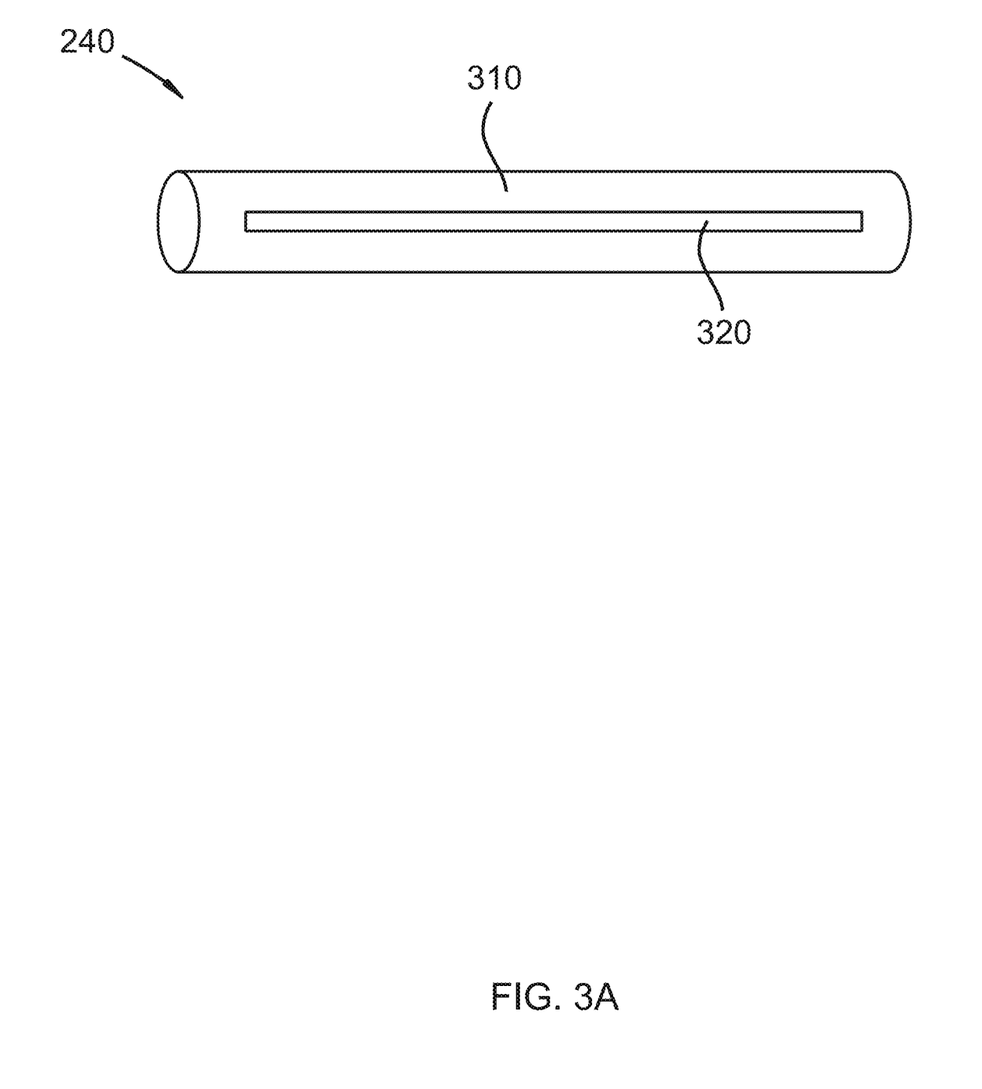
FIG. 3A illustrates an embodiment of the weight member that may be connected to the end of the disclosed roller shade.
Figure 3B:
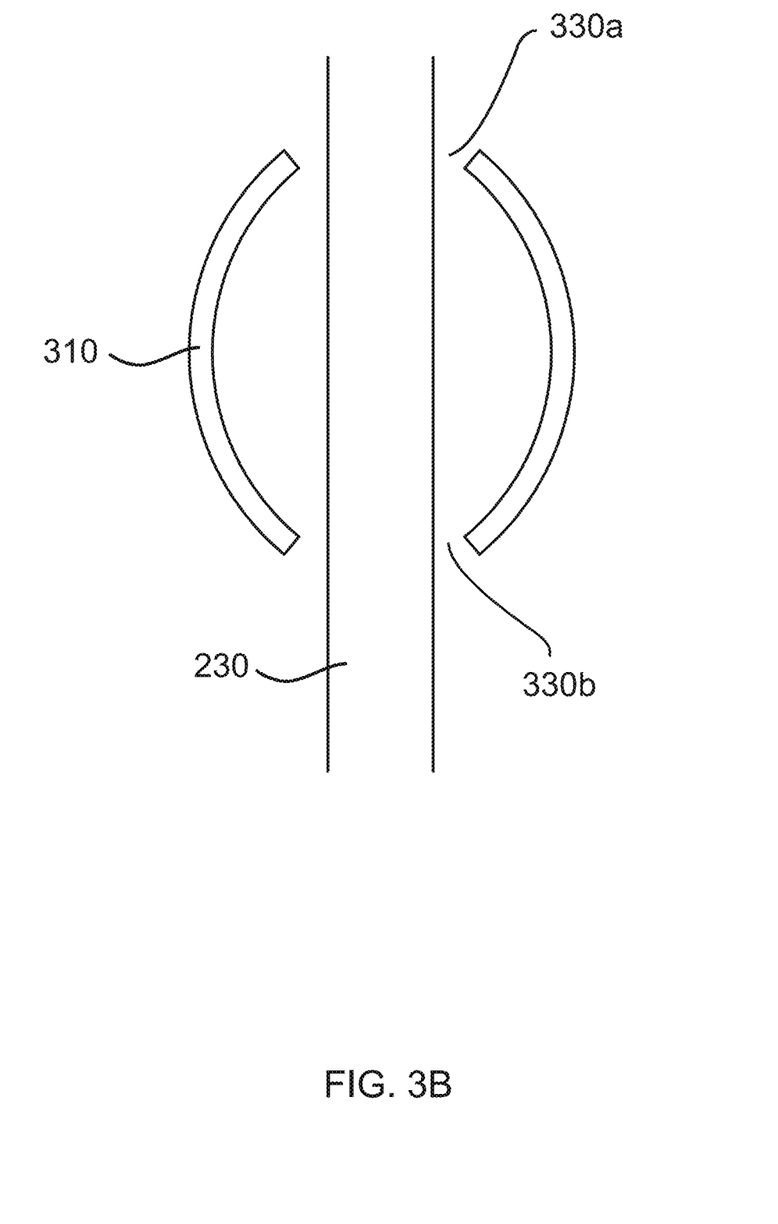
FIG. 3B illustrates a sectional view of the weight member of FIG. 3A.

FIGS. 3A and 3B show weight member 240 which may be positioned on a roller fabric of a roller shade according to the disclosure. Weight member 240 includes bar 310 which includes orifice 320. A roller fabric may be inserted into orifice 320 along the width of the roller fabric. The roller fabric, for example, that of either the embodiment of FIG. 1A or FIG. 2A, may be inserted through orifice 320 allowing weight member 240 to hang down creating tension.

FIG. 3B illustrates a cross section of weight member shown in FIG. 2B. Orifice 320 is divided into top opening 330a and bottom opening 330b. Light reflecting section 230 is shown inserted through top opening 330a and bottom opening 330b. Bar 310 may be constructed of a material that provides weight or an additional part, which may be end caps on bar 310, may be constructed of material that provides weight.

Figure 4:
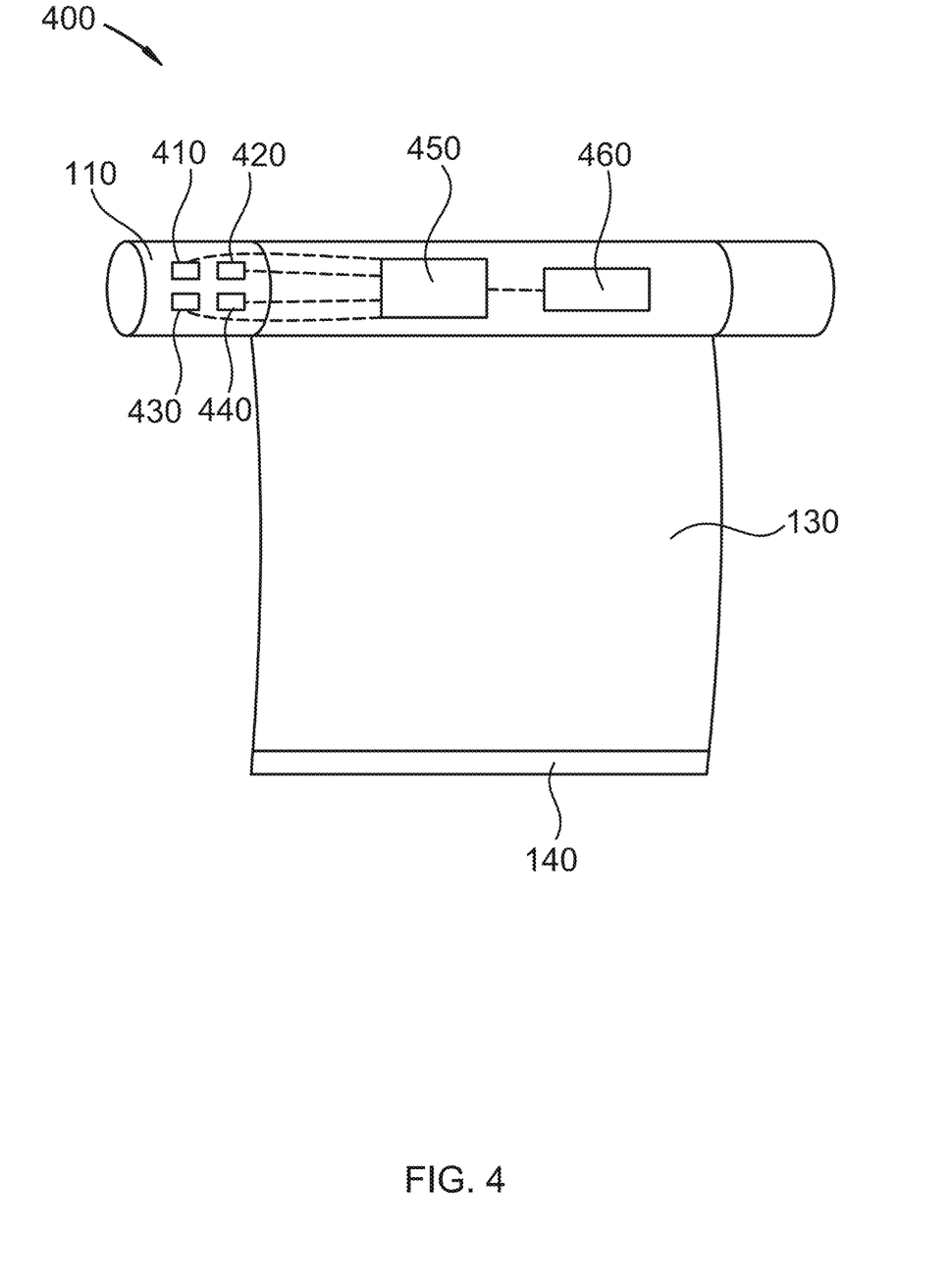
FIG. 4 illustrates an embodiment of the disclosed roller shade which includes sensors.

FIG. 4 illustrates roller shade 400 which is an embodiment of the disclosed roller shade. Roller shade 400 includes roller tube 110, a roller fabric showing light reflecting side 130 toward the viewer, and weight member 140, each of which may be similar to roller shades presented in other drawings herein. Sensors 410, 420, 430, and 440 are positioned on roller tube 110. These sensors may include, but are not limited to, a temperature sensor, a visible light sensor, an audio sensor, and an ultraviolet light sensor. Sensors 410, 420, 430, and 440 are shown in connection with controller 450 (see dotted lines). Controller 450 is shown connected to gear box 460 which may include a gear system, a battery, and a motor.

Figure 4A:
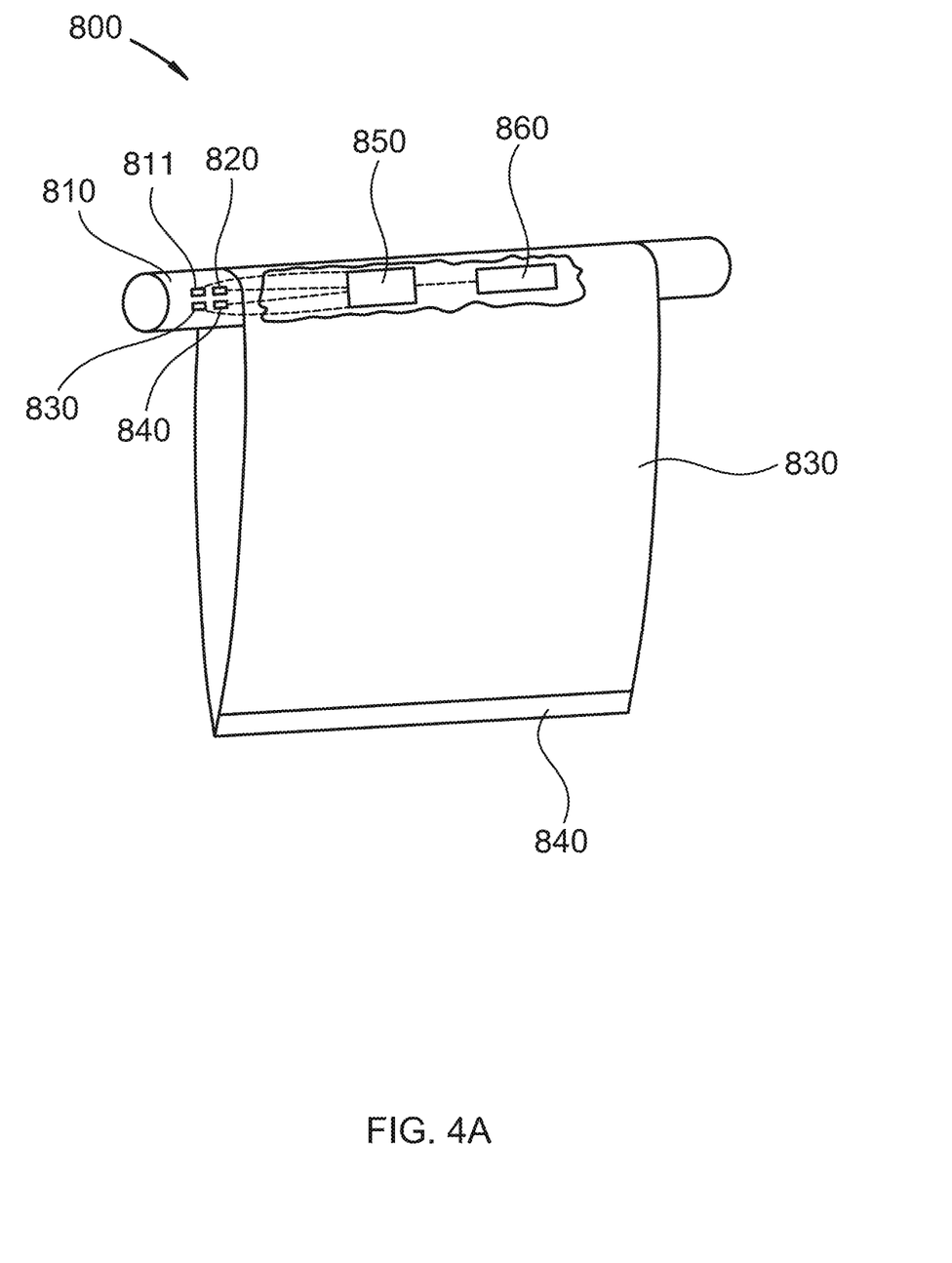
FIG. 4A illustrates an emobidment of the disclosed looped roller shade which includes sensors.

FIG. 4A illustrates roller shade 800 which is an embodiment of the disclosed looped roller shade. Roller shade 800 includes roller tube 810, a roller fabric showing light reflecting side 830 toward the viewer, and weight member 840, each of which may be similar to roller shades presented in other drawings herein. Sensors 811, 820, 830, and 840 are positioned on roller tube 810. These sensors may include, but are not limited to, a temperature sensor, a visible light sensor, an audio sensor, and an ultraviolet light sensor. Sensors 810, 820, 830, and 840 are shown in connection with controller 850 (see dotted lines). Controller 850 is shown connected to gear box 860 which may include a gear system, a battery, and a motor.

Figure 5:
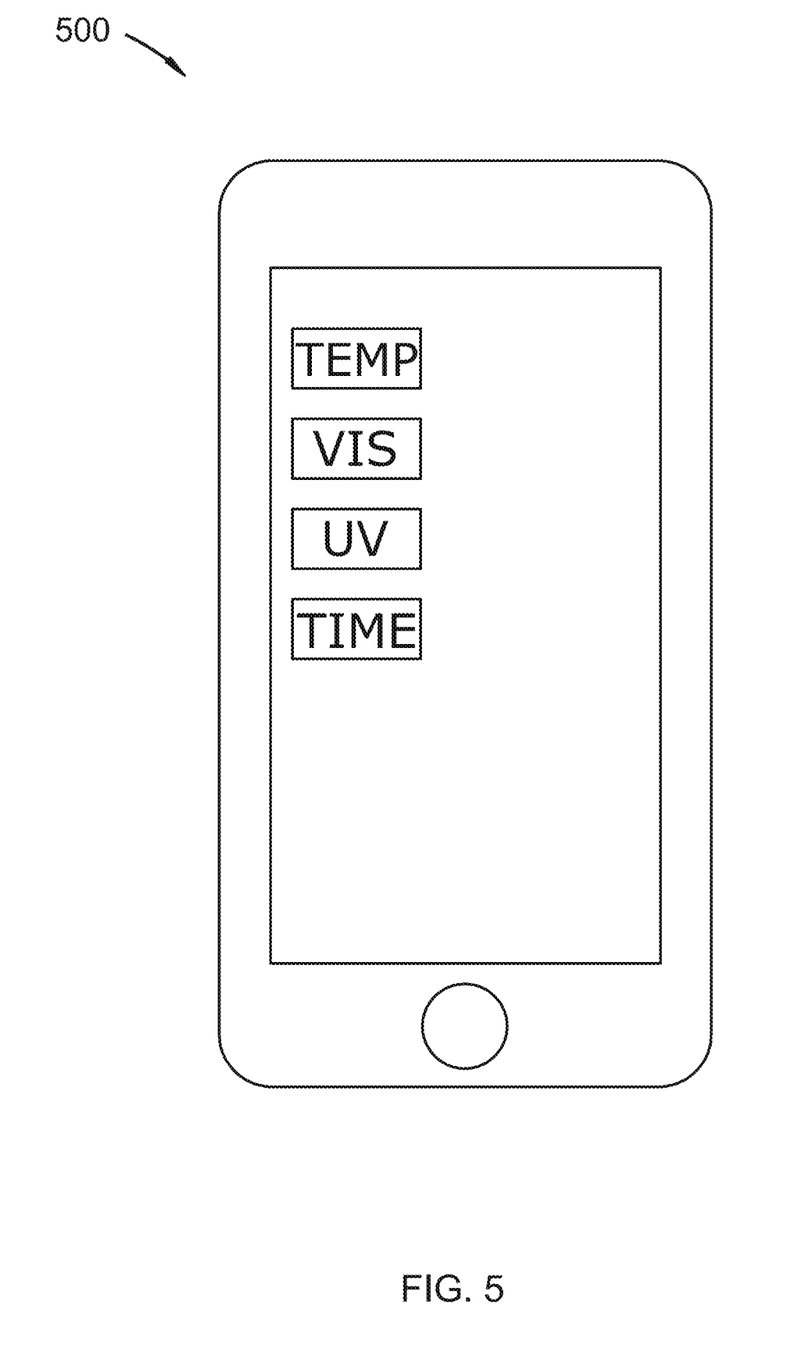
FIG. 5 illustrates an embodiment of screen on a mobile device which may be used to control the roller shade's response to sensor readings.

FIG. 5 illustrates a screen on mobile device 500 which a user may use to program the controller in an embodiment of the disclosed roller shade. This screen, or an embodiment thereof, may be used to instruct the controller to reverse the sides of the roller fabric when a sensor detects a threshold value. The sensors that may be controlled in the embodiment of FIG. 5 are temperature, visible light, ultraviolet (UV) light, and time. A user may touch the screen of mobile device 500 on the icon associated with the sensor to be controlled. A screen may appear which enables the user to input a threshold value or a time of day which may trigger the roller shade to reverse the roller fabric.

Figure 6:
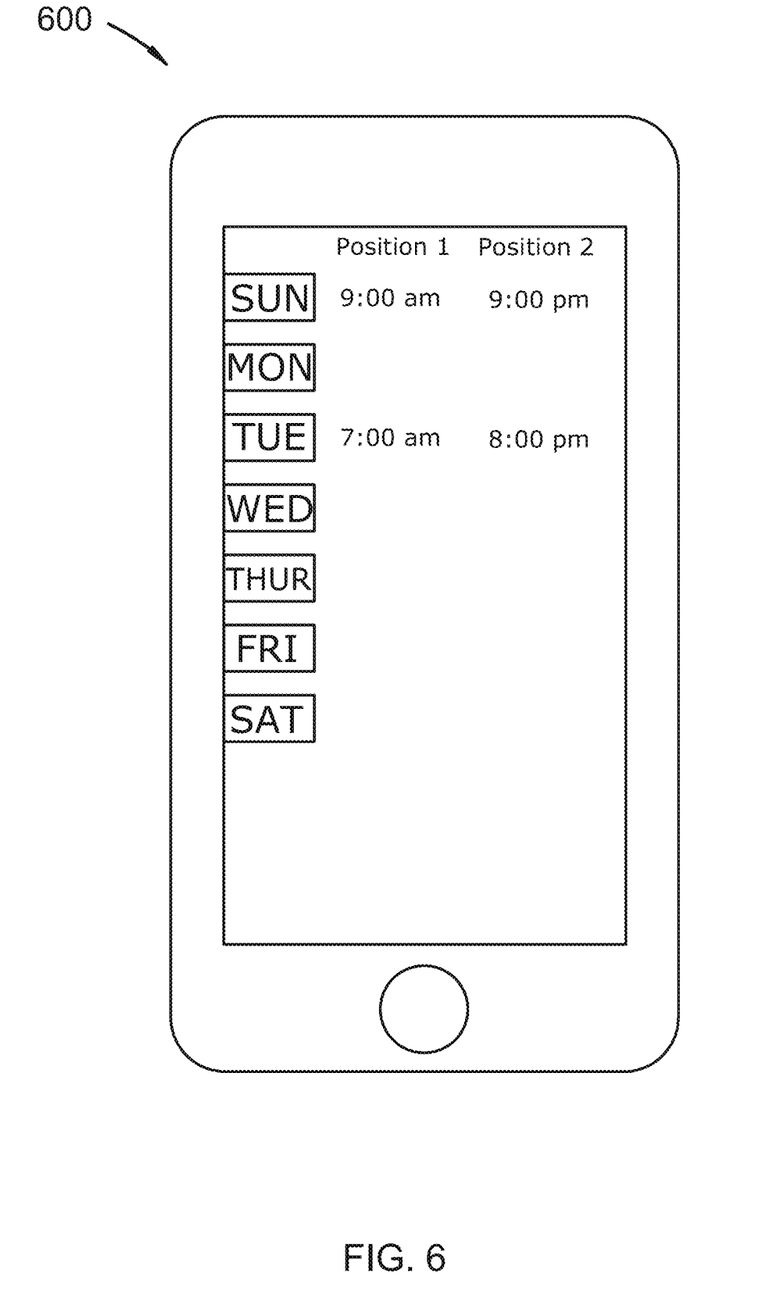
FIG. 6 illustrates an embodiment of screen on a mobile device which may be used to set the time at which the roller shade reverses the roller fabric.

FIG. 6 illustrates a screen on mobile device 600 which may be used to program the controller in an embodiment of the disclosed roller shade. This screen may be used to program the controller in the roller shade to reverse the roller fabric at defined times on the indicated days of the week. Position 1 and Position 2 may represent that either the heat absorbing side or the light reflecting side of the roller fabric facing the window.

Figure 7:
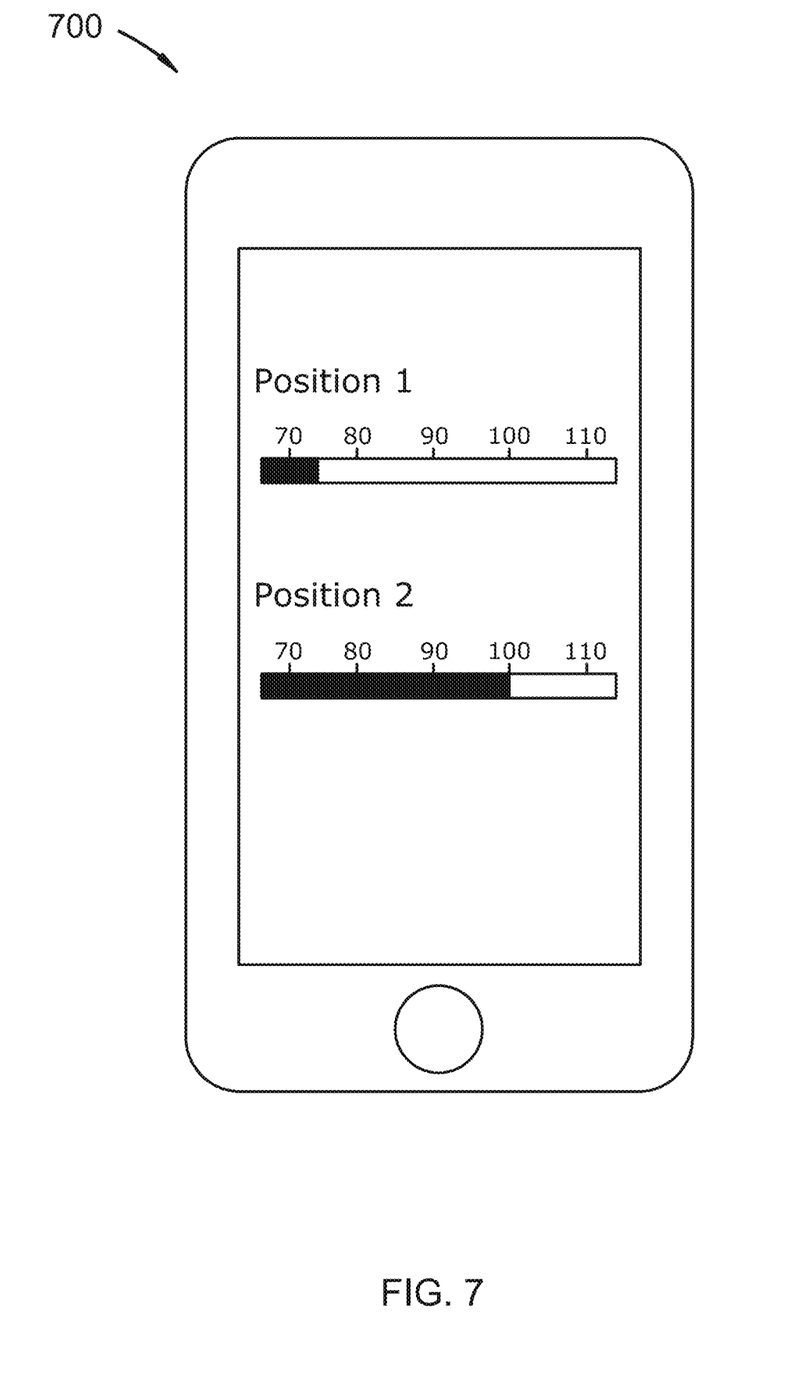
FIG. 7 illustrates an embodiment of screen on a mobile device which may be used to set the temperature at which the roller shade reverses the roller fabric.

FIG. 7 illustrates a screen on mobile device 700 which may be used to program the controller in an embodiment of the disclosed roller shade to reverse when temperature sensor detects a minimum and maximum temperature. Mobile device 700 shows that the roller shade will be in Position 1 at 75 degrees F. then switch to Position 2 when the temperature sensor detects a temperature of at least 100 F. Position 1 and Position 2 may represent that either the heat absorbing side or the light reflecting side of the roller fabric faces the window.

While specific embodiments have been illustrated and described above, it is to be understood that the disclosure provided is not limited to the precise configuration, steps, and components disclosed. Various modifications, changes, and variations apparent to those of skill in the art may be made in the arrangement, operation, and details of the methods and systems disclosed, with the aid of the present disclosure.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art that changes may be made to the details of the above-described embodiments without departing from the underlying principles of the disclosure herein.

The invention claimed is:

1. A roller shade comprising:
 a roller tube, the roller tube comprising an inner volume, the inner volume comprising:
  a reversible motor, within a gearbox, wherein the reversible motor is operably connected to the roller tube;
  a battery, wherein the battery is operably connected to the reversible motor;
  a controller adapted to be programmed by a mobile device; and
 a roller fabric, the roller fabric comprising:
  a loop with two sections;
  a first section comprising a light reflective material;
  a second section comprising a heat absorbing material;
 a weighted member, comprising a slot, wherein the roller fabric slides through the slot;
 wherein, when the light reflective material is positioned toward a window, solar light is reflected;
 wherein, when the heat absorbing material is positioned toward the window, heat is absorbed; and
  wherein the loop winds around the roller tube and through the slot in the weighted member to position either the first section or the second section of the roller fabric toward the window.

2. The roller shade of claim 1, wherein the light reflective material consists of one of the following: aluminum, Mylar, chrome, silver, nickel, or copper.

3. The roller shade of claim 1, wherein the roller tube further comprises at least one sensor for monitoring an environmental condition.

4. The roller shade of claim 1, further comprising an audio sensor, wherein the audio sensor detects a plurality of voice commands, and wherein the audio sensor sends one of a plurality of signals to the controller in response to one of the plurality of voice commands, and wherein the controller actuates the reversible motor to raise, lower, or reverse the roller fabric in response to one of the plurality of voice commands.

5. The roller shade of claim 3, wherein the at least one sensor comprises a visible light sensor, wherein the visible light sensor sends a signal to the controller that the visible light sensor has detected a defined light measurement within the wavelengths of visible light, and wherein the controller actuates the reversible motor to reverse the roller fabric in response to the signal.

6. The roller shade of claim 3, wherein the at least one sensor comprises an ultraviolet light sensor, wherein the ultraviolet light sensor sends a signal to the controller that the ultraviolet light sensor has detected a defined measurement of light within the wavelengths of ultraviolet light, and wherein the controller actuates the reversible motor to reverse the roller fabric in response to the signal.

7. The roller shade of claim 3, wherein the at least one sensor comprises a temperature sensor, wherein the temperature sensor sends a signal to the controller that the temperature sensor has detected a defined minimum or maximum temperature, and wherein the controller actuates the reversible motor to reverse the roller fabric in response to the signal.

8. The roller shade of claim 1, further comprising a programmable controller with memory for storing program code.

9. The roller shade of claim 8, wherein the memory stores a program code that receives signals from a mobile device.

10. The roller shade of claim 8, wherein the memory stores a program code which signals the reversible motor to reverse the roller fabric at defined times of day.

* * * * *